INVENTORS
Edward D Deery
Edward J Deery
Arthur R Deery

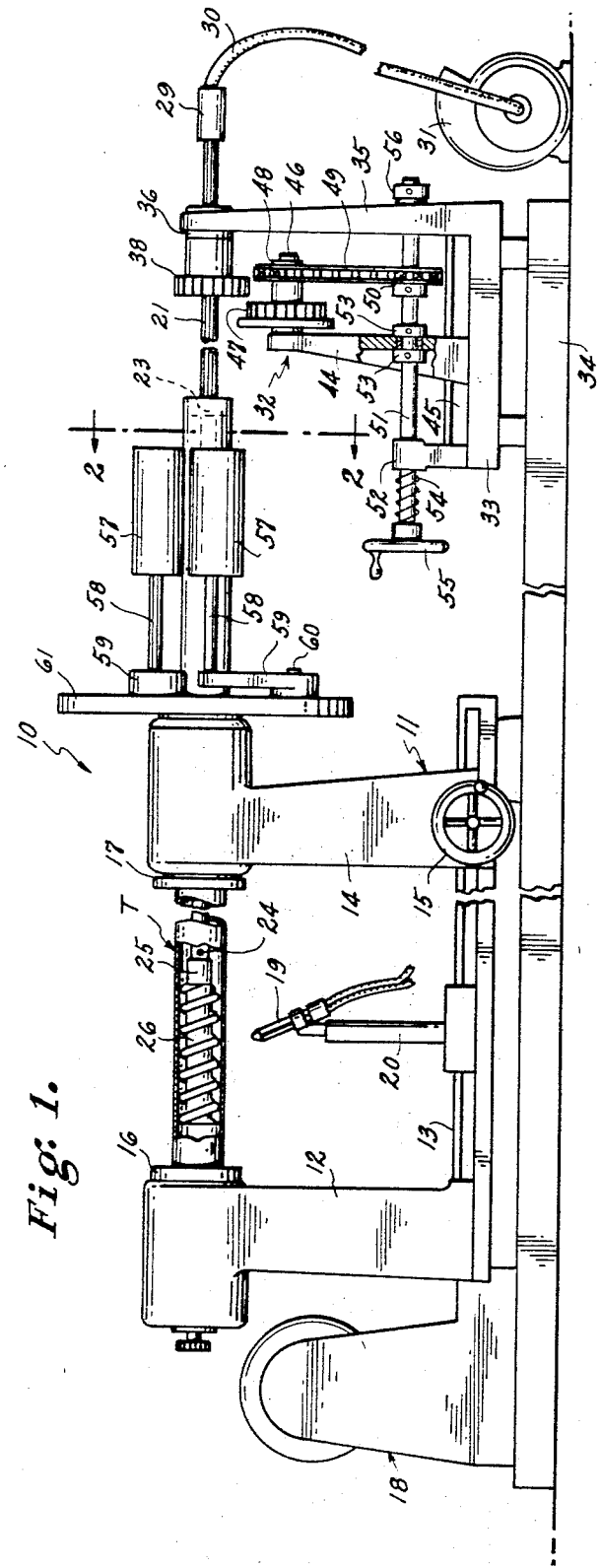
Fig. 1.
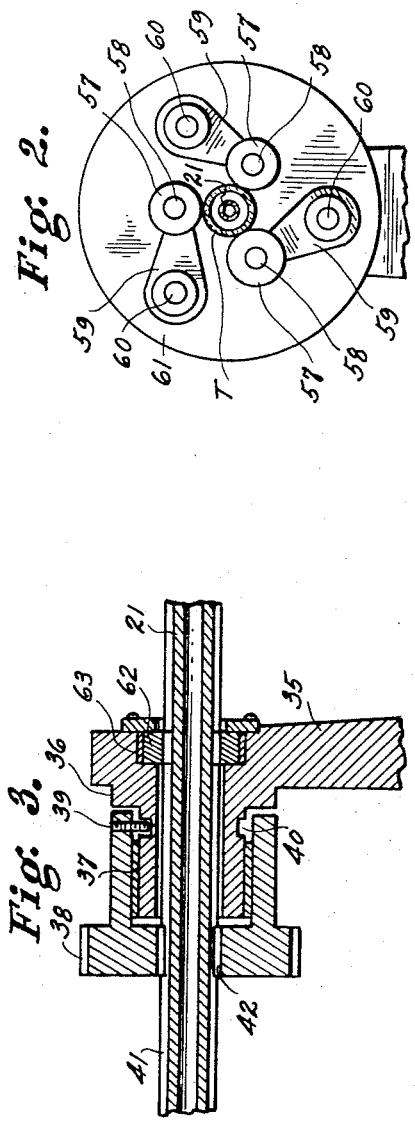
Fig. 2.
Fig. 3.
INVENTORS
Edward D. Deery
Edward J. Deery
Arthur R. Deery
Robert E. Isner
ATTORNEY Feb. 11, 1969 E. D. DEERY ET AL 3,427,143
APPARATUS FOR FORMING A HELICALLY SHAPED GLASS TUBE
Filed June 8, 1965 Sheet 2 of 2

ATTORNEY

United States Patent Office

3,427,143
Patented Feb. 11, 1969

3,427,143
APPARATUS FOR FORMING A HELICALLY SHAPED GLASS TUBE
Edward D. Deery, Edward J. Deery, and Arthur R. Deery, Yonkers, N.Y., assignors to Heights Laboratory Glass Inc., Yonkers, N.Y., a corporation of New York
Filed June 8, 1965, Ser. No. 462,342
U.S. Cl. 65—279    5 Claims
Int. Cl. C03b 23/04

ABSTRACT OF THE DISCLOSURE

Apparatus for imparting a helical configuration to thin-walled glass tubing induced by a pressure actuated collapse of heated tubing around a forming mandrel and wherein said tube is rotatably supported at a plurality of spaced locations so as to prevent undesired deformation thereof during a progressive forming operation wherein the internally disposed mandrel is rotated both conjointly with said tube and independently with respect thereto.

---

This invention relates generally to the forming of glass, and more particularly is directed to a method and apparatus for forming a cylindrical glass tube so as to impart a helical configuration to at least a portion of the length thereof.

It is an object of this invention to provide a method and apparatus by which a helical configuration can be imparted to at least a portion of the length of a cylindrical glass tube in a relatively economical and rapid manner.

Another object is to provide a method and apparatus by which a relatively long length of a cylindrical glass tube can be formed so as to have the configuration of a continuous helix.

A further object is to provide a method and apparatus for forming a cylindrical glass tube so as to impart a helical configuration to at least a portion of the length thereof, and wherein the formation of such helical configuration is accurately and uniformly controlled.

In accordance with an aspect of this invention, a helical configuration is imparted to at least a portion of a cylindrical glass tube by disposing a mandrel having a helically contoured surface within the portion of the cylindrical glass tube which is to be formed, heating the portion of the tube extending around the mandrel so as to soften such portion of the tube, exhausting air from within the glass tube for creating a vacuum therein so that atmospheric pressure causes the softened portion of the glass tube to collapse or be deformed inwardly against the mandrel and thereby conformed to the helically contoured surface of the mandrel, and then rotating the mandrel relative to the tube in the direction causing axial withdrawal of the mandrel from the deformed portion of the tube by an unscrewing action of the contoured surface of the mandrel with respect to the similarly deformed portion of the tube.

Where a relatively large length of a cylindrical glass tube is to be formed so as to have a continuous helical configuration, the helically shaped mandrel may have an axial length substantially smaller than the length of the tube to be formed and, in that case, regions or portions of the tube, each having an axial extent approximately equal to the length of the mandrel, are successively formed on the mandrel and the latter is turned relative to the glass tube after each forming operation so as to position the mandrel within the portion or region of the tube which is to be next formed, but with at least one turn of the helically contoured surface of the mandrel remaining engaged in the similarly contoured region of the glass tube subjected to the previous forming operation, thereby to ensure continuity of the helical configuration formed along a substantial length of the glass tube.

An apparatus embodying this invention generally comprises a glass working lathe having spaced heads containing rotated hollow spindles in which an elongated glass tube may be checked at substantially spaced locations along the latter for rotation about its longitudinal axis, stoppers or other means substantially sealing the ends of the tube, a hollow shaft extending axially into the tube through the stopper at one end of the latter and being rotatable with the glass tube upon rotation of the latter by the lathe and also free to move axially and rotatably relative to the glass tube, a mandrel of carbon or other high heat resistant material extending axially from the end of the hollow shaft within the glass tube and having a helically contoured surface, heating means for heating and thereby softening the glass tube at the region thereof surrounding the mandrel, and means connecting the end of the hollow shaft which projects from the glass tube to a source of vacuum so that air may be exhausted from within the glass tube by way of radial openings formed in the wall of the hollow shaft within the tube.

Although the hollow shaft which supports the mandrel within the glass tube may be turned relative to the glass tube for effecting more or less complete axial withdrawal of the mandrel from the helically formed portion of the tube by direct manual engagement with the portion of the shaft projecting from the glass tube, an apparatus in accordance with a preferred embodiment of the invention has a mechanism for effecting such turning of the shaft relative to the glass tube, and that mechanism preferably has a normally disengaged coupling or connection to the shaft so as to avoid interference with rotation of the shaft with the glass tube during each forming operation.

In order to avoid sagging of the glass tube between the heads of the lathes when the tube is heated at the region surrounding the mandrel, the apparatus in accordance with a preferred embodiment of the invention further has support rollers which may be suspended from one of the heads of the glass working lathes with their axes extending parallel to the axis of the glass tube, and which are positioned to engage the surface of the glass tube, at uniformly spaced locations around the latter, near the end portion of the tube through which the hollow shaft extends, thereby providing additional stabilizing support for the glass tube during the forming thereof.

The above, and other objects, features and advantages of the invention, will be apparent in the following detailed description of an illustrative embodiment thereof which is to be read in connection with the accompanying drawings, wherein:

FIG. 1 is a side elevational view which is partly schematic and partly in section, and which shows an apparatus for forming a glass tube in accordance with one embodiment of this invention;

FIG. 2 is a detail sectional view taken along the line 2—2 on FIG. 1;

FIG. 3 is a detail axial sectional view of a portion of the mechanism for effecting rotation of the hollow shaft relative to the tube, and which is on an enlarged scale;

Figure 4:
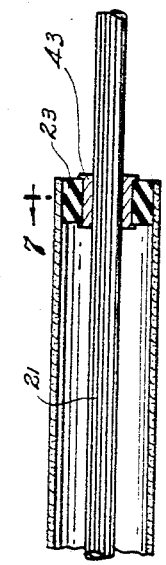
FIG. 4 is an axial sectional view illustrating a first step in the forming of a glass tube in accordance with this invention.
Figure 4:
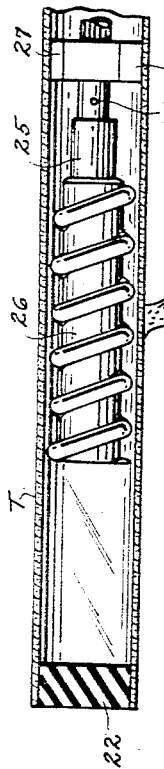

Referring to the drawings in detail, and initially to FIG. 1 thereof, it will be seen that the apparatus 10 there shown for forming glass in accordance with this invention generally comprises a glass working lathe 11 which may be of a commercially available type, for example, the model HSA glass working lathe produced by Litton Engineering Laboratories. The conventional lathe 11 includes a head 12 extending upwardly from a bed 13 and a head 14 mounted on the bed 13 for adjustment along the latter by manipulation of a hand wheel 15, thereby to vary the axial distance between the hollow spindles 16 and 17 which are rotatably supported in heads 12 and 14, respectively. One or each of the hollow spindles 16 and 17 is provided with a suitable chuck for securing therein an elongated glass tube T which is extended axially through the hollow spindle 17 and has one of its end portions received within hollow spindle 16. Thus, tube T is made to rotate with the spindles 16 and 17 when the latter are driven by the electric motor powered drive unit 18 of lathe 11. The conventional glass working lathe further includes an oxygen-gas burner or torch 19 mounted on a support 20 which is movable on bed 13 between heads 12 and 14.

The apparatus 10 in accordance with this invention further comprises an elongated hollow shaft 21 of substantially greater length than the glass tube T to be formed. The end of the glass tube T received in the spindle 16 is closed by a stopper 22 (FIGS. 4, 5 and 6), and the hollow shaft 21 extends axially into glass tube T through a stopper or sealing element 23 which closes the other end of the tube. The end of hollow shaft 21 extending into glass tube T has one or more radial holes 24 (FIGS. 1, 4, 5 and 6) for establishing communication between the interior of the hollow shaft and the space within tube T which is closed, at its opposite ends, by stoppers 22 and 23.

Figure 5:
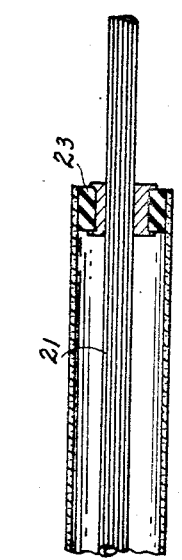
FIGS. 5 and 6 are views similar to that of FIG. 4, but showing succeeding steps in the forming of the tube.
Figure 5:
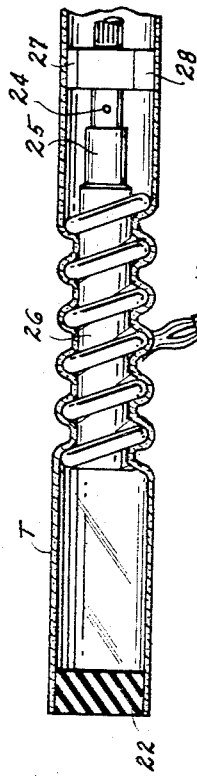
Figure 6:
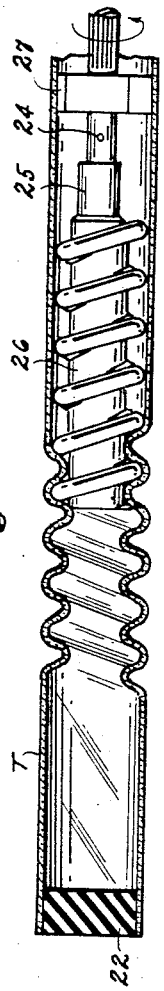

The end of shaft 21 within tube T supports, by way of a joint or connection 25, an axially extending mandrel 26 which, as shown particularly on FIGS. 4, 5 and 6, has a helically contoured surface. The mandrel 26 is formed of carbon or other high heat resistant material and is dimensioned to fit loosely within the cylindrical glass tube T, as shown on FIG. 4. The length of mandrel 26 may be only a fraction of the length of the glass tube which is to be formed so as to have a helical configuration. A centering member 27 (FIGS. 4, 5 and 6) is preferably mounted on hollow shaft 21 adjacent the end of the latter supporting mandrel 26 and is dimensioned to closely engage the inner surface of glass tube T for centering the mandrel with respect to the latter. The centering member 27 is preferably formed, for example, with axial grooves 28 in the periphery thereof, to permit the passage of air therethrough between the spaces within tube T at opposite sides of the centering member.

The end of hollow shaft 21 remote from mandrel 26, that is, the end of the shaft which projects out of glass tube T is connected through a glass blowing swivel 29 to a flexible hose 30 extending from a vacuum pump or other source of vacuum indicated schematically at 31. When the vacuum pump 31 is operated, air is exhausted from the space within the glass tube T by way of the opening or openings 24 of shaft 21 and the hollow interior or axial bore of the latter.

The apparatus 10, to the extent described above, may be employed for the forming of glass by the method embodying this invention. In accordance with such method, the helically shaped mandrel 26 is disposed within the glass tube T so as to extend to the point along the length of the glass tube at which the helical configuration is to commence, for example, at a distance of seven inches from the end of glass tube T closed by the stopper 22. The glass tube T is initially preheated by a Bunsen burner (not shown) which may be manually held so as to have its flame directed against the surface of the glass tube while the latter is rotated by the lathe 11 and air is exhausted from within the tube T by operation of the vacuum pump 31. After the tube T has been preheated, operation of the vacuum pump 31 is discontinued, and heat is applied to the glass tube by the oxygen-gas torch or burner 19. As shown on FIG. 4, the burner 19 is preferably located so as to direct its flame against the surface of the glass tube at a slight angle from the perpendicular to such surface and at a location along the tube which is intermediate the ends of mandrel 26, for example, approximately three turns of the helical surface of the mandrel from the free end of the latter. By reason of the continued rotation of glass tube T by lathe 11 and the conduction of heat axially along the glass tube, the latter is substantially uniformly heated throughout the region of the glass tube surrounding mandrel 26. When the glass of tube T becomes soft, the vacuum pump 31 is again operated to create a vacuum within glass tube T so that atmospheric pressure is then effective to collapse or deform the softened region of the glass tube inwardly against the helically contoured surface of mandrel 26, as shown on FIG. 5. When the region of the glass tube extending around mandrel 26 has been completely deformed or shaped to the helical contours of the surface of mandrel 26, the burner 19 is turned off or removed from the position where its flame plays against the glass tube, and operation of the lathe 11 is halted. The shaft 21, which has previously rotated with glass tube T, for example, in the clockwise direction, during rotation of the glass tube by the lathe, is now turned in the opposite or counterclockwise direction so as to unscrew or axially withdraw the mandrel 26 substantially from the region of glass tube T which has been previously formed to the helical contours of the mandrel.

Where the length of the tube T to be formed so as to have a helical configuration is greater than the length of the mandrel 26, the mandrel is not completely unscrewed or withdrawn from the previously formed region of the tube, but rather is turned relative to the tube until only the free end portion of the mandrel remains engaged in the similarly contoured end portion of the previously formed region of the glass tube, as particularly shown on FIG. 6. With the mandrel 26 repositioned within the tube T, as shown on FIG. 6, the above described steps of heating the tube and exhausting air from within the tube are repeated so as to cause the collapse or deformation against the helically contoured surface of the mandrel of the region of the glass tube then extending around the mandrel. The repositioning of the mandrel and the heating and collapsing or deformation of the tube against the helically contoured surface thereof are successively repeated until the desired length of the glass tube has been formed with the desired continuous helical configuration. Thereafter, the shaft 21 is finally turned relative to the glass tube so as to effect the complete removal of the mandrel from the helically formed portion of the glass tube.

Although turning of shaft 21 relative to the glass tube for effecting the unscrewing or withdrawing of the mandrel from a previously helically formed region of the glass tube may be effected by directly grasping the exposed end portion of shaft 21 and manually turning the latter, the apparatus 10 embodying this invention preferably includes a mechanism 32 (FIG. 1) which may be manually actuated at a location remote from shaft 21 to effect the desired turning of the latter relative to the glass tube. The mechanism 32, as shown, includes a frame 33 which may be mounted on the same base 34 as the bed of lathe 11 and which extends under the portion of shaft 21 projecting out of the glass tube T. Frame 33 has a standard 35 extending upwardly therefrom and provided with a hollow hub 36 at its upper end (FIGS. 1 and 3) through which shaft 21 extends axially. Hub 36 carries a bearing 37 (FIG. 3) on which a spur gear 38 is freely rotatable. The spur gear 38 is held against axial displacement, for example, by a set screw 39 engaging in a circumferential groove 40 formed in hub 36. Gear 38 is rotatably coupled to shaft 21 while permitting free axial movement of the latter, for example, by means of external and internal splines 41 and 42 formed on shaft 21 and gear 38, respectively.

Figure 7:
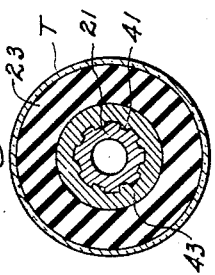
FIG. 7 is an enlarged sectional view taken along the line 7—7 on FIG. 4.

By reason of such splines 41 on shaft 21, the stopper 23 through which the shaft extends may be provided with an inner bushing 43 (FIGS. 4 and 7) which is turnable within the rubber stopper and provided with a splined inner surface cooperating with the splined surface of shaft 21, as shown on FIG. 7.

The mechanism 32 for turning shaft 21 further includes a support member 44 extending upwardly from frame 33 and movable along guides 45 which form part of the frame and extend parallel to the axis of shaft 21. A spindle 46 projects from the upper end of support member 44 parallel to shaft 21 and carries a rotatable gear 47 dimensioned to mesh with the gear 38. A sprocket 48 is also rotatable on spindle 46 and is rotatably coupled with the gear 47. The sprocket 48 is driven by a chain 49 running around a sprocket 50 secured to a shaft 51. The shaft 51 extends through support member 44 and is journaled in bearings carried by a bearing block 52 and the standard 35 extending from frame 33. The shaft 51 is rotatable and also axially movable in such bearings, and collars 53 are secured on shaft 51 at the opposite sides of support member 44 to cause displacement of the latter along guides 45 in response to axial displacement of shaft 51. Shaft 51 is urged in one axial direction, for example, by a helical compression spring 54 interposed between bearing block 52 and a hand wheel 55 on the end of the shaft, so as to normally displace support member 44 to the position shown on FIG. 1, where the gear 47 is axially displaced from gear 38 and therefore disengaged from the latter. Movement of shaft 51 by spring 54 is limited, for example, by a collar 56 secured on the end of the shaft remote from hand wheel 55 and engageable against the bearing in standard 35. When shaft 51 and support member 44 are in the position shown on FIG. 1, that is, with gear 47 disengaged from gear 38, shaft 21 is free to rotate with tube T during rotation of the latter by glass working lathe 11. However, when it is desired to turn shaft 21 relative to glass tube T, as described above, hand wheel 55 is pressed axially toward the right, as viewed on FIG. 1, so as to engage gear 47 with gear 38, and hand wheel 55 is then turned to effect the desired rotation of shaft 21.

In order to provide further stabilizing support for the glass tube T so that the latter will not sag when the tube is heated, and hence softened, in a region between heads 12 and 14 of the lathe, the apparatus 10 embodying this invention further preferably includes support rollers 57 (FIGS. 1 and 2) which may be three in number, as shown, and which are mounted for rolling engagement with the surface of tube T at equally spaced apart locations around the circumference of the latter near the end portion of tube T which projects from head 14 in the direction away from head 12. Each of the support rollers 57 is rotatably mounted on a shaft 58 extending parallel to the axis of tube T and being carried by an arm 59 which is, in turn, pivoted, as at 60, on a plate or disk 61 carried by the spindle 17 of head 14. The arms 59 are angularly urged, for example, by torsion springs (not shown) to turn relative to disk 61 in the direction for pressing the support rollers 57 inwardly against the surface of tube T. Since rollers 57 engage tube T adjacent the end thereof receiving the stopper 23 in which shaft 21 is slidable, the effect of rollers 57 is to indirectly support shaft 21 so that the mandrel 26 at the end of shaft 21 will hold the glass tube against sagging when it is softened. The shaft 21 may be further supported by means of a splined collar 62 (FIG. 3) in which shaft 21 is axially slidable, and which is turnable in a bearing 63 within the hub 36 of standard 35.

It will be apparent that the method and apparatus embodying this invention, as described above, make is possible to effect the relatively rapid and inexpensive uniform forming of cylindrical glass tubes so as to impart helical configurations to substantial portions of the length thereof. Further, the described method and apparatus permit relatively unskilled personnel to achieve such uniform forming of the glass tubes.

Although a particular embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

What is claimed is:

1. Apparatus for forming a thin-walled helically shaped glass tube comprising
   first means for rotatably supporting one end of an elongate thin-walled cylindrical glass tube,
   second means selectively positionable at spaced locations along said thin-walled tube remote from said first supporting means for rotatably supporting said glass tube at selected locations intermediate the ends thereof,
   means for rotating said tube supported by said first and second supporting means,
   sealing means for closing each end of the glass tube,
   cantilevered support means mounted on said second support means for rotatably supporting said thin-walled tube intermediate said second support means and the second end thereof,
   a hollow shaft extending axially through the sealing means at the end of said glass tube supported by said cantilevered support means and being both rotatably and axially displaceable with respect thereto, said hollow shaft being of a length sufficient to extend intermediate said first and second supporting means to provide a cantilever support for the portions of said tube adjacent the terminal end thereof,
   a mandrel member having a helically contoured surface extending axially from said terminal end of said shaft and positionable within said glass tube at locations intermediate said first and second supporting means,
   said hollow shaft having at least one radial opening adjacent said mandrel bearing end for communicating the interior of said hollow shaft with the space within said glass tube,
   heating means selectively positionable intermediate said first and second supporting means,
   softening the portions of the glass tube disposed around said mandrel,
   and means for connecting said hollow shaft with a source of vacuum during conjoint rotation of said tube and mandrel so as to create a vacuum in said glass tube and thereby cause collapse of the softened region of the said glass tube into conformity with the helically contoured surface of the mandrel while said softened portion of said tube is supported in coaxial alignment with the remainder thereof by the conjoint action of said cantilevered support means and said mandrel bearing hollow shaft.

2. Apparatus as set forth in claim 1 including means for rotating said hollow shaft relative to said rotatably supported glass tube to thereby unscrew and withdraw the mandrel member from the region of said glass tube previously conformed to the helically contoured surface thereof.

3. An apparatus as in claim 2; wherein said means for rotating the shaft includes normally disengaged drive means to free said shaft for conjoint rotation with the glass tube, said drive means being engaged to turn said shaft upon actuation of said mechanism.

4. An apparatus as in claim 3; wherein said drive means include a first gear rotatably coupled with said shaft and held against axial movement with the latter and a second gear axially movable from a disengaged position to a position in mesh with said first gear, and said mechanism further includes means manually actuable at said location remote from said shaft for turning said second gear and for displacing the latter axially from said disengaged position to said position in mesh with the first gear.

5. An apparatus as in claim 2; wherein said first and second supporting means comprises two spaced heads with hollow spindles rotatable therein to support the glass tube during forming of the latter between said heads; and wherein said cantilevered support means comprises a plurality of support rollers supported from said second head in parallel relation to the respective spindle and spaced axially from the latter to engage the glass tube adjacent said one end of the latter through which the shaft extends thereby to support the shaft indirectly by way of said sealing means at said one end of the glass tube.

References Cited

UNITED STATES PATENTS

| | | | |
|---|---|---|---|
| 2,613,479 | 10/1952 | Stong | 65—277 X |
| 2,822,501 | 2/1958 | Poulter | 65—110 X |
| 3,091,105 | 5/1963 | Morrill | 65—110 X |

DONALL H. SYLVESTER, *Primary Examiner.*

A. D. KELLOGG, *Assistant Examiner.*

U.S. Cl. X.R.

65—109, 110, 282, 293